US008878702B2

(12) United States Patent
Crucs

(10) Patent No.: US 8,878,702 B2
(45) Date of Patent: Nov. 4, 2014

(54) TRANSPORTATION ALERT APPLICATION FOR A MOBILE COMMUNICATION DEVICE

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 796 days.

(21) Appl. No.: 12/906,373

(22) Filed: Oct. 18, 2010

(65) Prior Publication Data

US 2012/0092194 A1 Apr. 19, 2012

(51) Int. Cl.
*G06F 15/02* (2006.01)

(52) U.S. Cl.
USPC .......... 340/994; 340/995.23; 705/1.1; 705/28

(58) Field of Classification Search
USPC ................. 340/988, 989, 991, 992, 993, 994, 340/995.19, 928, 502, 504, 506, 539.11, 340/995.23; 701/23, 50, 207, 208, 211, 701/213, 465, 519; 705/28, 338; 455/404.2, 455/456.2
See application file for complete search history.

(56) References Cited

U.S. PATENT DOCUMENTS

| | | | | |
|---|---|---|---|---|
| 4,350,969 | A | 9/1982 | Greer | |
| 5,349,340 | A | 9/1994 | Blumenthal | |
| 6,177,889 | B1 | 1/2001 | Grande | |
| 6,226,572 | B1 * | 5/2001 | Tojima et al. | 701/23 |
| 6,317,060 | B1 | 11/2001 | Jones | |
| 6,700,506 | B1 | 3/2004 | Winkler et al. | |
| 7,202,801 | B2 | 4/2007 | Chou | |
| 7,394,404 | B2 | 7/2008 | Kim | |
| 7,561,069 | B2 * | 7/2009 | Horstemeyer | 340/994 |
| 7,996,512 | B2 * | 8/2011 | Adelman et al. | 709/223 |
| 8,340,904 | B2 * | 12/2012 | Lin | 701/465 |
| 2002/0135534 | A1 | 9/2002 | Elsten | |
| 2003/0149644 | A1 * | 8/2003 | Stingel et al. | 705/28 |
| 2008/0045240 | A1 | 2/2008 | Cole et al. | |
| 2009/0248828 | A1 | 10/2009 | Gould et al. | |
| 2011/0218933 | A1 * | 9/2011 | Hunsaker et al. | 705/338 |

FOREIGN PATENT DOCUMENTS

| | | | |
|---|---|---|---|
| EP | 1868175 | A2 | 12/2007 |
| GB | 2382709 | A | 6/2003 |
| GB | 2404068 | A | 1/2005 |
| GB | 2448672 | A | 10/2008 |

(Continued)

OTHER PUBLICATIONS

The International Search Report and The Written Opinion of the International Search Authority; International Application No. PCT/US2011/056360; Form PCT/ISA/220; International Searching Authority—Korean Intellectual Property Office; Date of Mailing of the International Search Report—May 7, 2012; p. 1-8.

*Primary Examiner* — Van T. Trieu
(74) *Attorney, Agent, or Firm* — Hahn Loeser & Parks LLP; Brendan E. Clark

(57) ABSTRACT

A system and method for providing notification about approaching transportation. A transportation notification application on a mobile communication device associated with a transportation vehicle is activated. An operator of the transportation vehicle selects a predefined route, having multiple transportation stops to be traversed by the transportation vehicle, from the transportation notification application on the mobile communication device. A current transportation stop of the selected route is then selected, again using the transportation notification application on the mobile communication device. The transportation notification application on the mobile communication device then automatically sends a transportation notification message, in response to the selecting of the current transportation stop, to a plurality of user communication devices of known users of the transportation vehicle who are associated with at least one subsequent transportation stop of the transportation vehicle.

39 Claims, 5 Drawing Sheets

(56) References Cited

FOREIGN PATENT DOCUMENTS

| | | | |
|---|---|---|---|
| JP | 2005-122443 | A | 5/2005 |
| KR | 2007-0073255 | A | 7/2007 |
| WO | 9604634 | A1 | 2/1996 |
| WO | WO98/07128 | A1 | 2/1998 |
| WO | WO98/08206 | A2 | 2/1998 |

* cited by examiner

TRANSPORTATION ALERT APPLICATION FOR A MOBILE COMMUNICATION DEVICE

TECHNICAL FIELD

Certain embodiments of the present invention relate to transportation and communications. More particularly, certain embodiments of the present invention relate to systems and methods for providing advance notification of an approaching transportation vehicle to a plurality of individuals.

BACKGROUND

Today, parents or children waiting for a school bus are often unaware of when the bus will arrive at their stop. Sometimes the bus is later than usual and sometimes the bus is earlier than usual, depending on traffic conditions and weather, for example. As a result, parents and/or children may typically try to get to the bus stop extra early, to make sure they don't miss the bus. This can cause extra stress for the parents or children when trying to get ready for their day. It can also result in the parents and/or children having to wait longer at the bus stop in inclement weather if the bus is late. Similar difficulties can arise when, for example, a parent is waiting for the school bus to drop off their child at a bus stop at the end of the day. Users of other forms of transportation, especially public transportation, can experience similar difficulties and inconvenience.

Further limitations and disadvantages of conventional, traditional, and proposed approaches will become apparent to one of skill in the art, through comparison of such systems and methods with the present invention as set forth in the remainder of the present application with reference to the drawings.

SUMMARY

An embodiment of the present invention comprises a method for providing notification about approaching transportation to provide a transportation alert service. The method includes activating a transportation notification application on a mobile communication device associated with a transportation vehicle that makes multiple transportation stops along predefined routes. The transportation vehicle may be, for example, a bus, a car, a truck, a train, a taxi cab, a trolley, or a boat. Other transportation vehicles are possible as well. The method further includes selecting a predefined route, having multiple transportation stops to be traversed by the transportation vehicle, from the transportation notification application on the mobile communication device. The method also includes selecting a current transportation stop of the selected predefined route using the transportation notification application on the mobile communication device. The method further includes the transportation notification application on the mobile communication device automatically sending a transportation notification message, in response to the selecting of a current transportation stop, to a plurality of user communication devices of known users of the transportation vehicle who are associated with at least one subsequent transportation stop (e.g., a next stop) of the transportation vehicle. The transportation notification message may be in the form of an electronic mail (email) message, an electronic text message, or a voice telephone message, for example. Other forms of messages are possible as well, in accordance with various embodiments of the present invention. In accordance with an embodiment of the present invention, the transportation notification message is sent from the mobile communication device to the plurality of user communication devices via at least one communication network associated with the mobile communication device. The communication network may include at least one of, for example, a cellular telephone network, the internet, and a satellite network. Other communication networks are possible as well. The method may further include a location-based services application running on the mobile communication device that automatically communicates a current location of the transportation vehicle to the transportation notification application. The step of selecting a current transportation stop may be performed automatically by the transportation notification application based on the current location. In accordance with an embodiment of the present invention, the method may also include programming a new predefined route into the transportation notification application on the mobile communication device which may be subsequently selected, deleting a predefined route, or modifying a predefined route. A user communication device may include a complementary notification application running on the user communication device which activates a transportation alert ringtone in response to receiving a transportation notification message. Alternatively, a user may program their user communication device to activate a user-selected ringtone in response to receiving a transportation notification message, where the user-selected ringtone is reserved for receiving a transportation notification message. The mobile communication device may be a wireless communication device, in accordance with an embodiment of the present invention, and each of the plurality of user communication devices may include one of a wireless communication device or a wired communication device. Furthermore, each of the plurality of user communication devices may include one of a mobile communication device or a non-mobile communication device. The method may further include programming new user information associated with a user communication device into the transportation notification application and associating the new user information with one transportation stop of a predefined route on the mobile communication device. Similarly, the method may include deleting user information associated with a user communication device from the transportation notification application on the mobile communication device.

Another embodiment of the present invention comprises a system for providing notification about approaching transportation. The system includes a mobile communication device associated with a transportation vehicle that makes multiple transportation stops along predefined routes. The transportation vehicle may be, for example, a bus, a car, a truck, a train, a taxi cab, a trolley, or a boat. Other transportation vehicles are possible as well. The system further includes means for selecting a predefined route, having multiple transportation stops, to be traversed by the transportation vehicle using the mobile communication device. The system also includes means for selecting a current transportation stop of the predefined route using the mobile communication device. The system further includes means for automatically sending a transportation notification message from the mobile communication device, in response to selecting a current transportation stop, to a plurality of user communication devices of known users of the transportation vehicle associated with at least one subsequent transportation stop (e.g., a next stop) of the transportation vehicle. The transportation notification message may be in the form of an electronic mail (email) message, an electronic text message, and a voice telephone call, for example. Other types of transportation notification messages are possible as well. The system may also include means for automatically acquiring a current location of the transportation vehicle using the mobile communication device, and means for communicating the current location to the means for selecting a current transportation stop using the mobile communication device. The means for selecting a current transportation stop may use the current location to automatically select a current transportation stop. The system may further include means for entering a new selectable predefined route into the mobile communication device, deleting a predefined route, and modifying a predefined route. The system may also include means for activating a transportation alert ringtone on at least one of the user communication devices in response to receiving a transportation notification message. The system may further include means for activating a user-selected ringtone on at least one of the user communication devices in response to receiving a transportation notification message, where the user-selected ringtone is reserved for receiving transportation notification messages. The mobile communication device may be a wireless communication device, in accordance with an embodiment of the present invention, and each of the plurality of user communication devices may include one of a wireless communication device or a wired communication device. Furthermore, each of the plurality of user communication devices may include one of a mobile communication device or a non-mobile communication device. The system may further include means for programming new user information associated with a user communication device into the mobile communication device and associating the new user information with one transportation stop of a predefined route on the mobile communication device. The system may also include means for deleting user information associated with a user communication device from the mobile communication device.

A further embodiment of the present invention comprises a system for providing notification about approaching transportation. The system includes a global positioning system (GPS) receiver installed within a transportation vehicle that makes multiple transportation stops along predefined routes. The system also includes a transmitter installed within the transportation vehicle. The transmitter is operatively connected to the GPS receiver to receive location information from the GPS receiver and is configured to wirelessly transmit the location information. The system further includes a communication system installed, at least partially, at a fixed third party location. The communication system is configured to wirelessly receive the location information from the transmitter. The communication system is further configured to generate and transmit transportation notification messages based on the location information. The communication system may include at least one of a cellular telephone network, the internet, and a satellite network. The system may also include a plurality of user communication devices of known users of the transportation vehicle associated with at least one transportation stop of the transportation vehicle. Each of the plurality of user communication devices is configured to receive transportation notification messages. The transportation notification messages may be in the form of electronic mail messages, electronic text messages, and voice telephone calls, for example, and may include information related to at least one of an estimated arrival time, an arrival at another stop, a delay, a reminder, and a cancellation.

These and other advantages and novel features of the present invention, as well as details of illustrated embodiments thereof, will be more fully understood from the following description and drawings.

DETAILED DESCRIPTION

Figure 1:
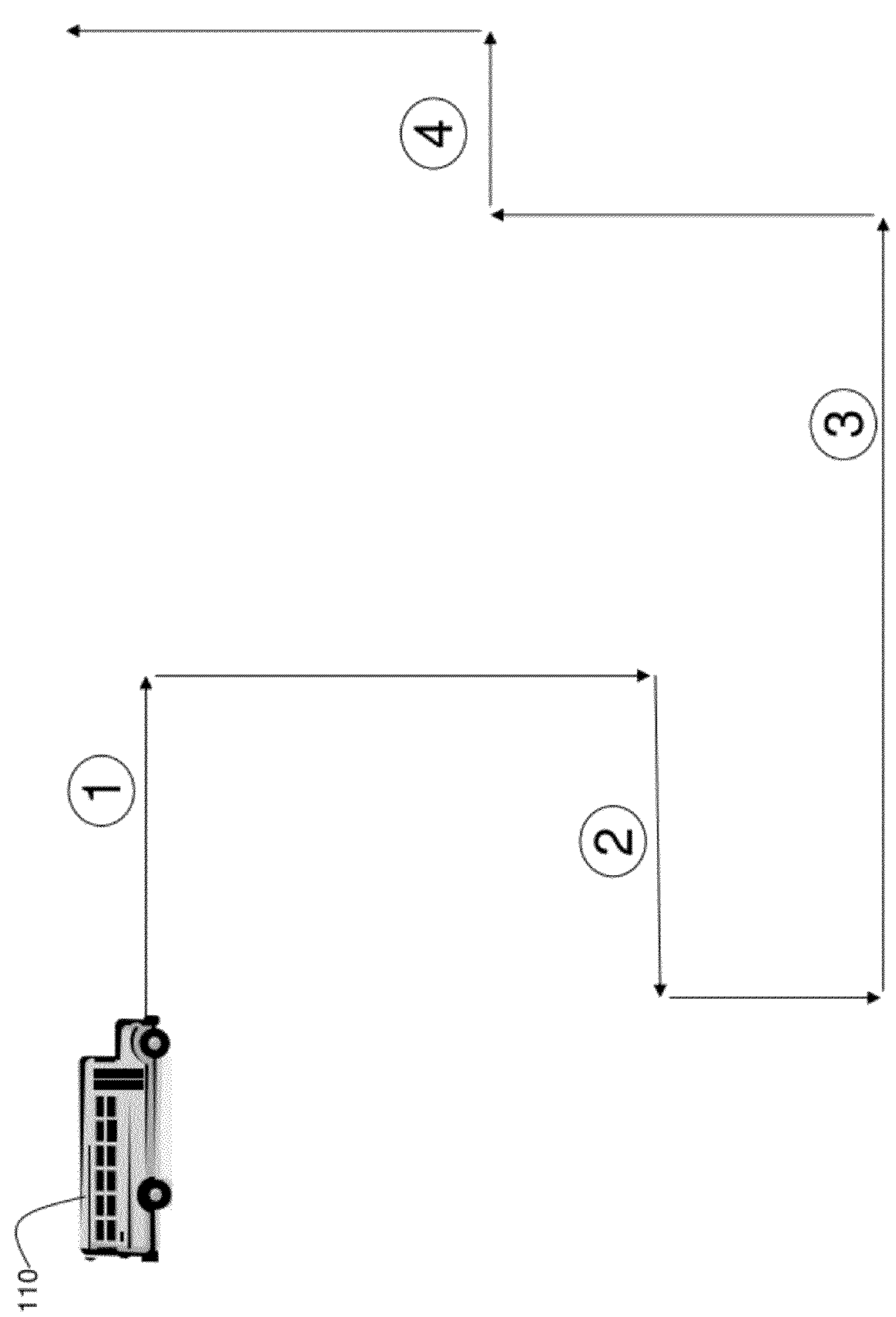
FIG. 1 illustrates an example embodiment of a predefined route taken by a transportation vehicle to pick up and/or drop off people at four different transportation stops along the route.

The term “ringtone” as used herein means any audible signal output by a user communication device in response to receiving a call or message. FIG. 1 illustrates an example of a predefined route 100 taken by a transportation vehicle 110 to pick up and/or drop off people (riders or commuters) at different transportation stops (e.g., transportation stops 1-4) along the route 100. The transportation vehicle may be, for example, a school bus, a city bus, or some other type of transportation vehicle such as a car, a truck, a train, a taxi cab, a trolley, or a boat (e.g., a ferry). In accordance with an embodiment of the present invention, a driver or operator of the transportation vehicle 110 has a mobile communication device that is used to alert or notify people, who desire to board the vehicle 110 at upcoming stops, that the vehicle 110 is approaching and getting close to their stop. The notification is accomplished in such a manner that a person that desires to board at a particular stop does not have to actually be at, or even near, the stop to receive the notification. As a result, an individual may rely on the notification to avoid waiting a long time at a stop, for example, in inclement weather.

Figure 2:
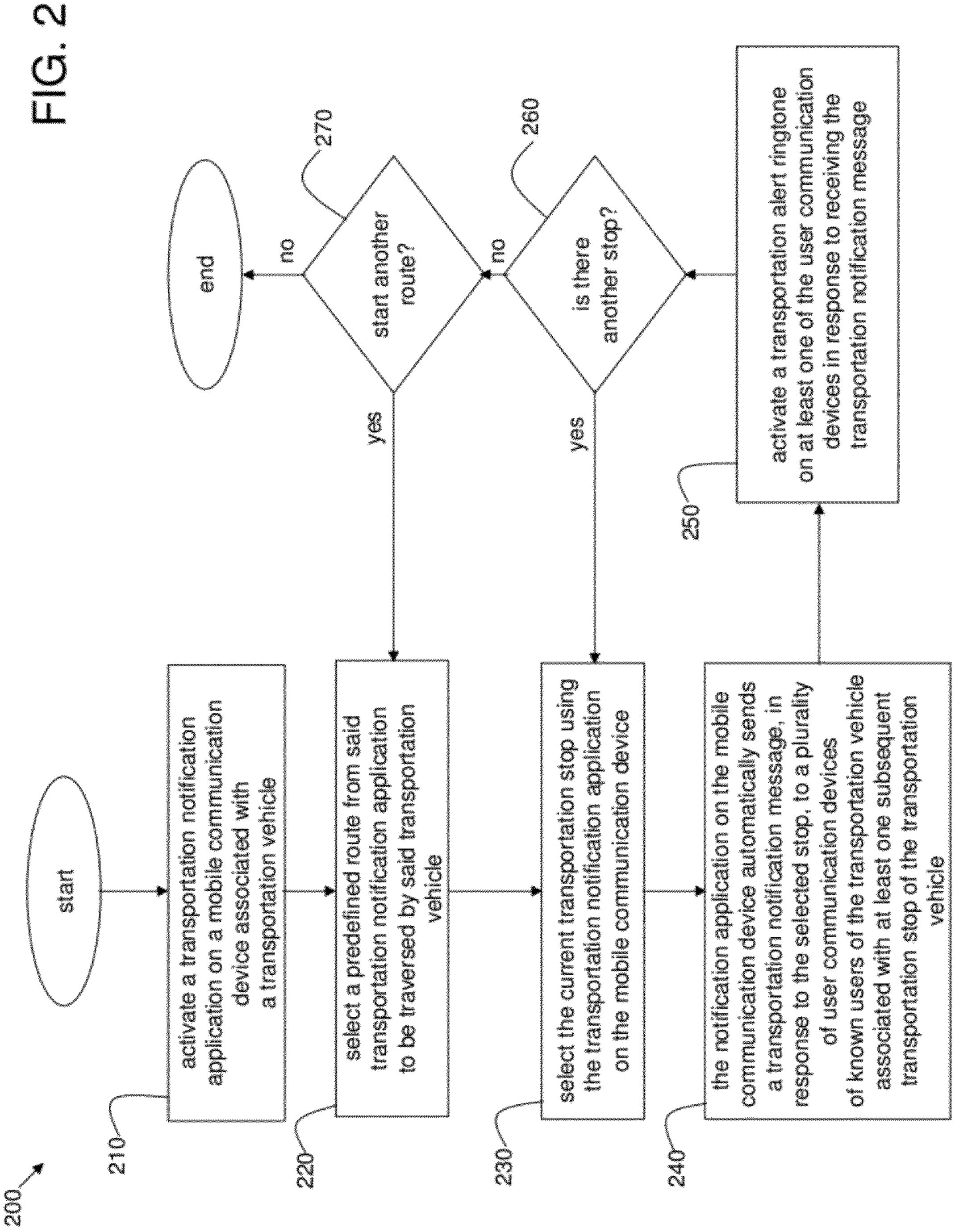
FIG. 2 is a flowchart of an example embodiment of a method for providing notification about approaching transportation.

FIG. 2 is a flowchart of an example embodiment of a method 200 for providing notification about approaching transportation. In step 210, a transportation notification application is activated on a mobile communication device associated with a transportation vehicle. In step 220, a predefined route is selected from the transportation notification application which is to be traversed by the transportation vehicle. In step 230, a current transportation stop is selected using the transportation notification application on the mobile communication device. In step 240, the notification application on the mobile communication device automatically sends a transportation notification message, in response to the selected stop, to a plurality of user communication devices of known users (riders or commuters) of the transportation vehicle who are associated with at least one subsequent transportation stop of the transportation vehicle. In step 250, a transportation alert ringtone is activated on at least one of the user communication devices in response to receiving the transportation notification message. In step 260, if there is another stop that is arrived at on the route, then the method 200 reverts back to step 230. Otherwise, in step 270, if a new route is to be started, the method 200 reverts back to step 220. Otherwise, the method 200 ends.

Figure 3:
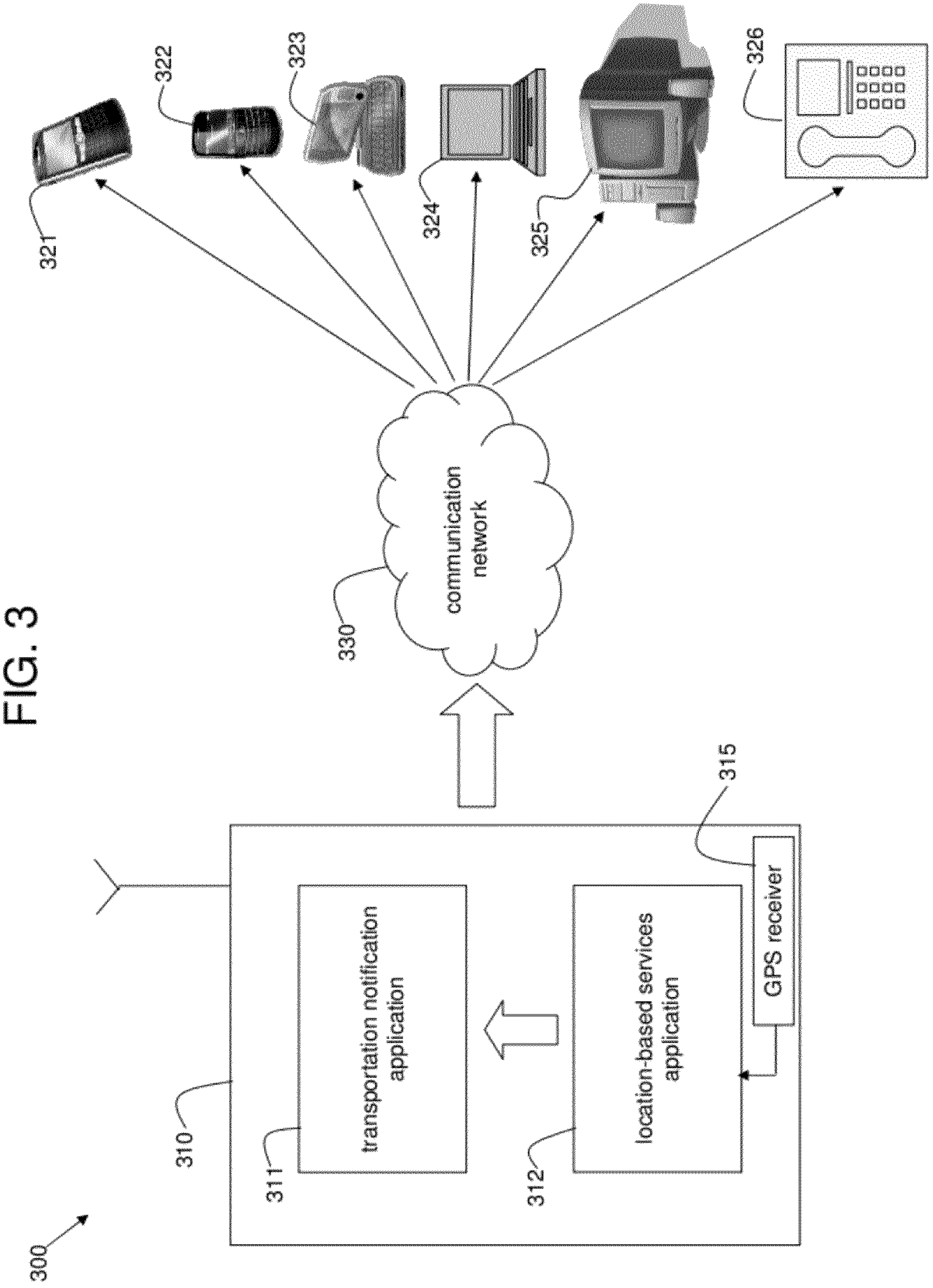
FIG. 3 illustrates a schematic diagram of an example embodiment of a system for providing notification about approaching transportation.

FIG. 3 illustrates a schematic diagram of an embodiment of a system 300 for providing notification about approaching transportation. The system 300 includes a mobile communication device 310 which is used by the operator of the transportation vehicle 110. The mobile communication device 310 is a wireless communication device (e.g., a cell phone) having a transportation notification application 311 (i.e., a software application) residing thereon, in accordance with an embodiment of the present invention. The transportation notification application 311 on the mobile communication device 310 allows the method 200 to be performed.

The system 300 also includes a plurality of user communication devices 321-326 which may be wired or wireless, mobile or non-mobile, and may include cells phones, lap top computers, desk top computers, and land line telephones, for example. The system 300 further includes a communication network 330 which allows the mobile communication device 310 to communicate with the plurality of user communication devices 321-326. The communication network 330 may be, for example, a cell phone network, the internet, or a satellite communications network. Other types of communication networks are possible as well, in accordance with other embodiments of the present invention. In accordance with an alternative embodiment of the present invention, the mobile communication device 310 communicates directly with the user communication devices 321-326, not through an intermediate network.

As an example, referring to the method 200 of FIG. 2 and the predefined route 100 of FIG. 1, a driver of the bus 110 activates the transportation notification application 311 on the mobile communication device 310 by, for example, selecting a button or displayed icon that is representative of the application 311. The transportation notification application 311 may be programmed with a plurality of predefined routes which may be selected in a similar manner, for example, from a displayed menu on the mobile communication device 310. After activation, the driver selects the predefined route 100 which is programmed into the transportation notification application 311. Upon arriving at transportation stop 1, the driver selects a button or icon that is representative of the current transportation stop (i.e., transportation stop 1) as recognized by the transportation notification application 311 using the mobile communication device 310. The current transportation stop is that stop at which the transportation vehicle is currently located.

In response to selecting the current transportation stop 1, the transportation notification application 311 on the mobile communication device 310 automatically sends a transportation notification message to user communication devices 321-323, which are programmed in the transportation notification application 311 to be associated with people who are to be picked up at subsequent transportation stop 2. As a result, while the bus 110 is picking up people at transportation stop 1, people who desire to be picked up at transportation stop 2 are being notified that the bus 110 is getting close to their stop.

The transportation notification message may be in the form of an e-mail, a text message, or a voice message, for example, each of which is predefined (e.g., pre-stored and/or pre-recorded) in the transportation notification application 311. Other types of transportation notification messages are possible as well, in accordance with various embodiments of the present invention. For example, a transportation notification message may include information related to estimated arrival times, arrivals at other stops, delays, reminders, and cancellations. As an example, a transportation notification message may simply read "RIDE IS APPROACHING" or "BUS IS 3 MINUTES AWAY".

Upon arriving at transportation stop 2, the driver selects a button or icon that is representative of the current transportation stop (i.e., new transportation stop 2) as recognized by the transportation notification application 311 using the mobile communication device 310. In response to selecting the current transportation stop 2, the transportation notification application 311 on the mobile communication device 310 automatically sends a transportation notification message to user communication devices 324-325, which are programmed in the transportation notification application 311 to be associated with people who are to be picked up at subsequent transportation stop 3.

Upon arriving at transportation stop 3, the driver selects a button or icon that is representative of the current transportation stop (i.e., new transportation stop 3) as recognized by the transportation notification application 311 using the mobile communication device 310. In response to selecting the current transportation stop 3, the transportation notification application 311 on the mobile communication device 310 automatically sends a transportation notification message to user communication device 326, which is programmed in the transportation notification application 311 to be associated with people who are to be picked up at subsequent transportation stop 4.

In accordance with certain embodiments of the present invention, the transportation notification application 311 may be configured to send a transportation notification message to more than one subsequent stop such as, for example, the next stop and the stop directly after the next stop. In this way, a person to be picked up at a particular transportation stop may receive at least two notification messages. The first notification message may be treated by the recipient as a warning message and the second notification message may be treated as a final alert, for example. Other messaging strategies are possible as well. For example, if transportation stops on a particular route are relatively close together, then the transportation notification application 311 may be configured to send the notification message two stops ahead, skipping the next stop, in order to provide adequate notification time.

The mobile communication device 310 may further have a location-based services (LBS) application 312 (i.e., a software application) residing thereon, in accordance with an embodiment of the present invention. The LBS application 312 running on the mobile communication device 310 is configured to automatically communicate a current location of the mobile communication device 310 (and, therefore, a current location of the vehicle 110) to the transportation notification application 311. The mobile communication device 310 may include a global positioning system (GPS) receiver 315 that operates with the LBS application 312 to determine location. Alternatively, the LBS application 312 may communicate with an external server, for example, to acquire location information.

The transportation notification application 311 may be configured to associate transportation stops with corresponding location information. Therefore, when the LBS application 312 sends a current location to the transportation notification application 311, the transportation notification application 311 can determine if the bus 110 is at a particular transportation stop. As a result, in accordance with an embodiment of the present invention, the method step 230 of selecting a current transportation stop is performed automatically by the transportation notification application 311 based on the current location received from the LBS application 312. That is, in such an embodiment, the operator of the bus 110 does not have to manually select the current transportation stop.

The transportation notification application 311 may be programmed with newly defined routes, old routes may be modified and updated, and obsolete routes may be deleted. Furthermore, a new user (i.e., a rider or a commuter) may be added to the transportation notification application 311 by programming new user information associated with a new user's communication device into the transportation notification application 311 and associating the new user information with a transportation stop of a predefined route on the mobile communication device 310. User information may also be deleted or changed within the transportation notification application, and associations with stops may be changed.

A user communication device may have a complementary notification application running on it which automatically activates a transportation alert ringtone in response to receiving a transportation notification message. Alternatively, a user may simply program their user communication device to activate a user-selected ringtone in response to receiving a transportation notification message. As a result, the user-selected ringtone is reserved for receiving a transportation notification message. Such a ringtone may be triggered by the identifying phone number (e.g., MSID) of the sender (i.e., the mobile communication device 310).

As an option, if the transportation vehicle 110 is running behind schedule, the operator of the vehicle 110 may select a special function of the transportation notification application 311 on the mobile communication device 310 which sends out a special transportation notification message to all user communication devices associated with the route. The special transportation notification message communicates to the users that the transportation vehicle is running late or has been delayed. An amount of time of the delay may also be included in the message. For example, the transportation notification application 311 may allow the operator of the vehicle to enter a time delay number to be sent as part of the message. Furthermore, if the delay is due to a breakdown of the transportation vehicle, the special transportation notification message may indicate that pickups along the route have been cancelled, or that a new vehicle is being routed.

In accordance with an embodiment of the present invention, security checks may be implemented which prevent unauthorized persons from signing up for the transportation alert service as described herein. For example, parents would not want just anyone to be able to know when children are being dropped off from school. A background check and establishment of proof of relevancy to the transportation route may be performed before an individual is accepted into the system.

Figure 4:
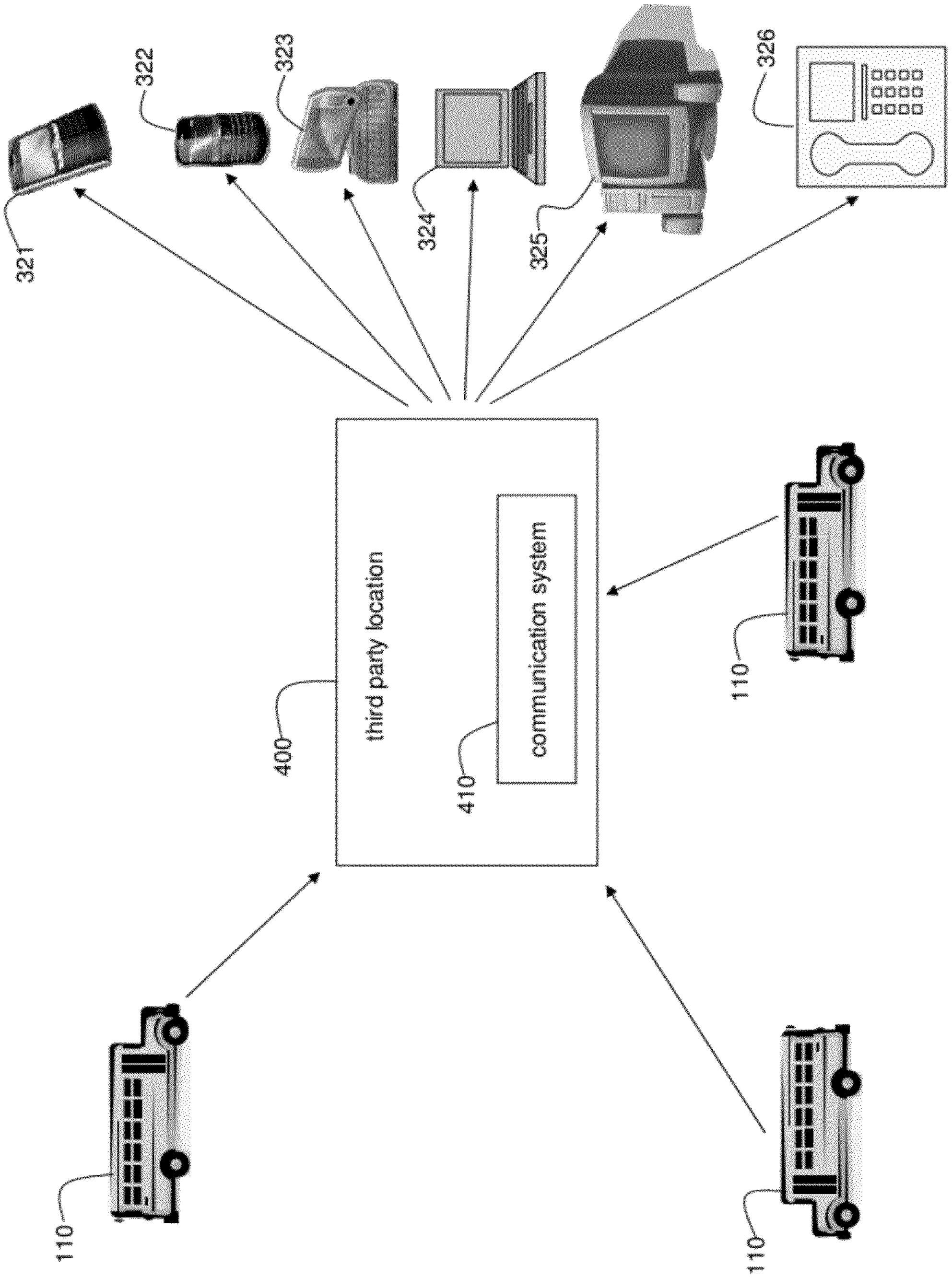
FIG. 4 illustrates an example of an alternative embodiment of a system for providing notification about approaching transportation.
Figure 5:
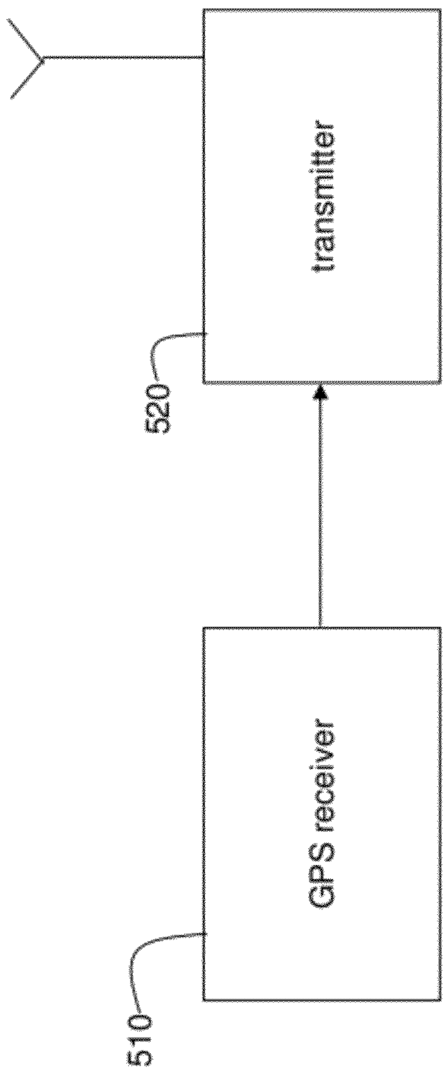
FIG. 5 illustrates an example embodiment of equipment installed in transportation vehicles of the system of FIG. 4.

In accordance with an alternative embodiment of the present invention, the transportation vehicle 110 may be tracked by a third party that is monitoring the GPS location of the vehicle 110 as illustrated in FIG. 4. For example, the mobile communication device 310 may transmit its GPS position to a third party location 400 having a dedicated communication system 410. The communication system 410 is configured to generate and send various notification messages when the transportation vehicle 110 approaches various trigger points or stops. In this manner, the vehicle 110 does not generate and send the notification messages but, instead, the communication system 410 of the third party location 400 generates and sends the notification messages to the associated user communication devices (e.g., 321-326). Alternatively, the transportation vehicle 110 may not have a mobile communication device 310 but may, instead, be equipped with a GPS receiver 510 interfacing to a dedicated transmitter 520 for transmitting GPS location information to the communication system 410 of the third party location 400 as illustrated in FIG. 5. The GPS receiver 510, the transmitter 520, and the communication system 410 may each operate on a different radio frequency, in accordance with an embodiment of the present invention.

Such a third party location 400 may serve to overcome potential problems associated with embodiments where the mobile communication device 310 sends the notification messages. For example, the mobile communication device 310 may experience signal loss, intermittent connectivity, or weak communication at various locations. By having a third party location 400 track the vehicle 110 (or vehicles, if there is more than one), the third party location 400 determines when and to whom to send notification messages based on the position of the vehicles 110 and may be located in a location that provides more reliable communication connectivity (e.g., stronger signal, direct internet connection). That is, the notification functionality of the mobile communication device 310 is now implemented in the communication system 410 of the third party. Furthermore, a third party location 400 can better handle when accidents or breakdowns occur that require a change in vehicles to pick up where another vehicle left off.

In summary, a system and method for providing notification about approaching transportation are disclosed. A transportation notification application on a mobile communication device associated with a transportation vehicle is activated. An operator of the transportation vehicle selects a predefined route, having multiple transportation stops to be traversed by the transportation vehicle, from the transportation notification application on the mobile communication device. A current transportation stop of the selected route is then selected, again using the transportation notification application on the mobile communication device. The transportation notification application on the mobile communication device then automatically sends a transportation notification message, in response to the selecting of the current transportation stop, to a plurality of user communication devices of known users of the transportation vehicle who are associated with at least one subsequent transportation stop of the transportation vehicle.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method for providing notification about approaching transportation, said method comprising:

a user, of a mobile communication device associated with a transportation vehicle that makes multiple transportation stops along predefined routes, activating a transportation notification application on the mobile communication device;

the user selecting a predefined route, having multiple transportation stops to be traversed by said transportation vehicle, from said transportation notification application on said mobile communication device;

the user selecting a current transportation stop of said selected predefined route using said transportation notification application on said mobile communication device; and said transportation notification application on said mobile communication device automatically sending a transportation notification message, in response to said selecting of a current transportation stop, to a plurality of user communication devices of known users of said transportation vehicle associated with at least one subsequent transportation stop of said transportation vehicle.

2. The method of claim 1 wherein said transportation notification message is sent from said mobile communication device to said plurality of user communication devices via at least one communication network associated with said mobile communication device.

3. The method of claim 2 wherein said at least one communication network includes at least one of a cellular telephone network, the internet, and a satellite network.

4. The method of claim 1 further comprising programming a new predefined route into said transportation notification application on said mobile communication device.

5. The method of claim 1 further comprising deleting a predefined route from said transportation notification application on said mobile communication device.

6. The method of claim 1 further comprising modifying a predefined route of said transportation notification application on said mobile communication device.

7. The method of claim 1 wherein said transportation notification message is in the form of one of an electronic mail message, an electronic text message, and a voice telephone call.

8. The method of claim 1 further comprising a complementary notification application running on at least one of said user communication devices activating a transportation alert ringtone in response to receiving said transportation notification message.

9. The method of claim 1 further comprising at least one of said user communication devices activating a user-selected ringtone in response to receiving said transportation notification message, wherein said user-selected ringtone is reserved for receiving said transportation notification message.

10. The method of claim 1 wherein said at least one subsequent transportation stop includes a next transportation stop.

11. The method of claim 1 wherein said mobile communication device includes a wireless communication device.

12. The method of claim 1 wherein each of said plurality of user communication devices includes one of a wireless communication device and a wired communication device.

13. The method of claim 1 wherein each of said plurality of user communication devices includes one of a mobile communication device and a non-mobile communication device.

14. The method of claim 1 wherein said transportation vehicle includes one of a bus, a car, a truck, a train, a taxi cab, a trolley, and a boat.

15. The method of claim 1 further comprising programming new user information associated with a user communication device into said transportation notification application and associating said new user information with one transportation stop of a predefined route on said mobile communication device.

16. The method of claim 1 further comprising deleting user information associated with a user communication device from said transportation notification application on said mobile communication device.

17. The method of claim 1 wherein said transportation notification message includes information related to at least one of an estimated arrival time, an arrival at another stop, a delay, a reminder, and a cancellation.

18. The method of claim 1, wherein said transportation notification message includes a relative notification message.

19. The method of claim 1, wherein said at least one subsequent transportation stop includes one or more future stops beyond a next transportation stop.

20. The method of claim 1, wherein said transportation notification message includes information relating to a vehicle breakdown.

21. The method of claim 1, wherein said transportation notification message includes information relating to a new vehicle being sourced to service said predefined route.

22. The method of claim 1, further comprising performing a security check related to said plurality of user communication devices.

23. The method of claim 22, wherein said security check confirms that each of said known users associated with each of said plurality of user communication devices has a relevant connection to said predefined route.

24. A system for providing notification about approaching transportation, said system comprising:

a user mobile communication device associated with a transportation vehicle that makes multiple transportation stops along predefined routes;

means for allowing a user to select a predefined route, having multiple transportation stops to be traversed by said transportation vehicle, using said mobile communication device;

means for allowing a user to select a current transportation stop of said predefined route using said mobile communication device; and means for automatically sending a transportation notification message from said mobile communication device, in response to selecting a current transportation stop, to a plurality of user communication devices of known users of said transportation vehicle associated with at least one subsequent transportation stop of said transportation vehicle.

25. The system of claim 24 further comprising means for entering a new selectable predefined route into said mobile communication device.

26. The system of claim 24 further comprising means for deleting a predefined route from said mobile communication device.

27. The system of claim 24 further comprising means for modifying a predefined route on said mobile communication device.

28. The system of claim 24 wherein said transportation notification message is in the form of one of an electronic mail message, an electronic text message, and a voice telephone call.

29. The system of claim 24 further comprising means for activating a transportation alert ringtone on at least one of said user communication devices in response to said at least one of said user communication devices receiving said transportation notification message.

30. The system of claim 24 further comprising means for activating a user-selected ringtone on at least one of said user communication devices in response to said at least one of said user communication devices receiving said transportation notification message, wherein said user-selected ringtone is reserved for receiving said transportation notification message.

31. The system of claim 24 wherein said at least one subsequent transportation stop includes a next transportation stop.

32. The system of claim 24 wherein said mobile communication device includes a wireless communication device.

33. The system of claim 24 wherein each of said plurality of user communication devices includes one of a wireless communication device and a wired communication device.

34. The system of claim 24 wherein each of said plurality of user communication devices includes one of a mobile communication device and a non-mobile communication device.

35. The system of claim 24 wherein said transportation vehicle includes one of a bus, a car, a truck, a train, a taxi cab, a trolley, and a boat.

36. The system of claim 24 further comprising means for programming new user information associated with a user communication device into said mobile communication device and associating said new user information with one transportation stop of a predefined route on said mobile communication device.

37. The system of claim 24 further comprising means for deleting user information associated with a user communication device from said mobile communication device.

38. The system of claim 24, further comprising means for performing a security check related to said plurality of user communication devices.

39. The system of claim 38, wherein said means for performing security check confirms that each of said known users associated with each of said plurality of user communication devices has a relevant connection to said predefined route.

* * * * *